April 25, 1950   D. C. McCRARY ET AL   2,505,420
CONTROL SYSTEM FOR REGULATING QUANTITIES,
FORCES, OR OTHER FACTORS Filed Aug. 28, 1945   2 Sheets-Sheet 1

Inventor
Dorris C. McCrary.
James D. Dent.

By Clarence A. O'Brien
and Harvey B. Jacobson
Attorneys

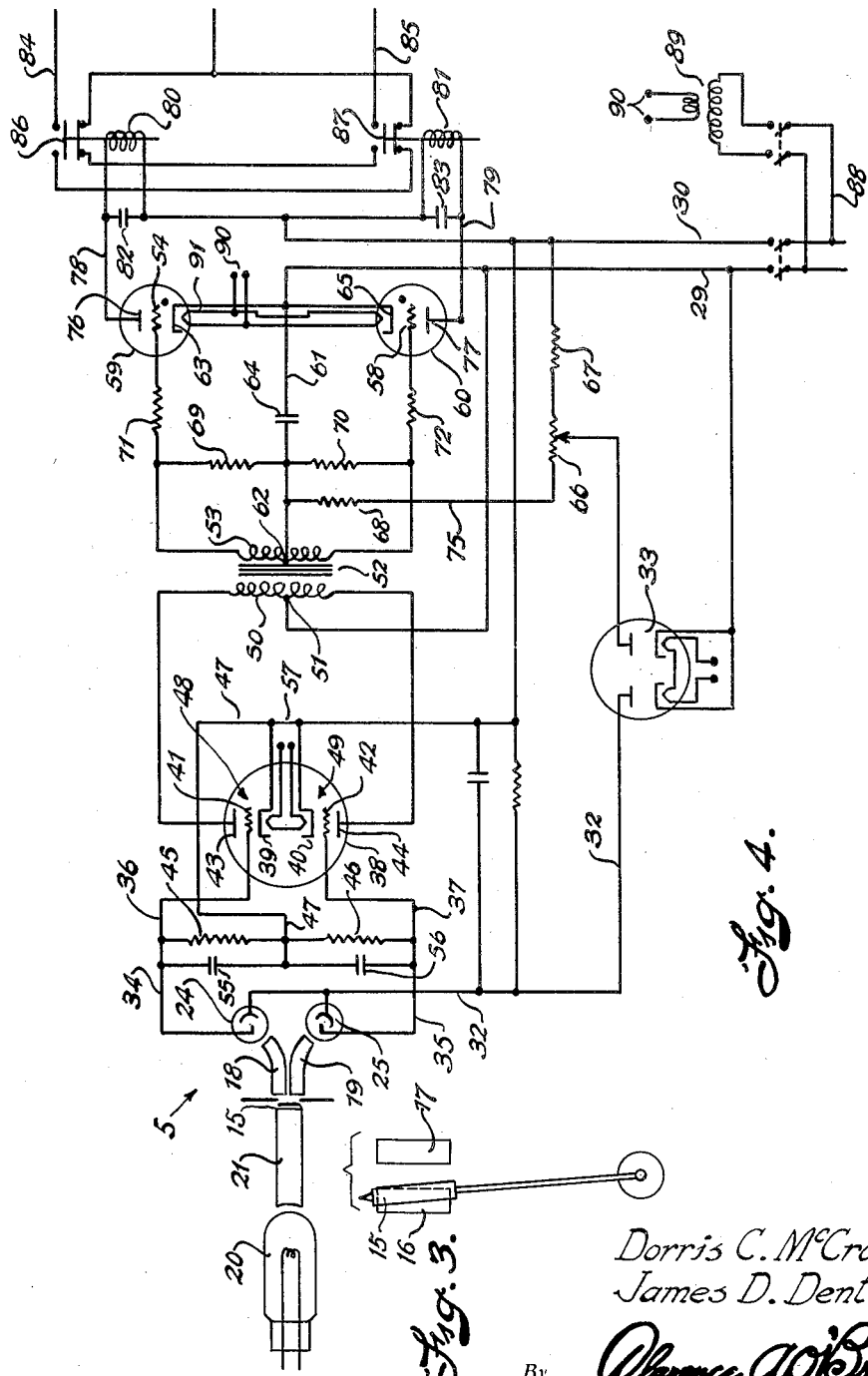

Patented Apr. 25, 1950

2,505,420

UNITED STATES PATENT OFFICE 2,505,420

CONTROL SYSTEM FOR REGULATING QUANTITIES, FORCES, OR OTHER FACTORS

Dorris C. McCrary, Henderson, Nev., and James D. Dent, Brawley, Calif.

Application August 28, 1945, Serial No. 613,180

7 Claims. (Cl. 250—231)

This invention relates to control systems and it has particular reference to systems in which a quantity or value of any kind or type which is capable of being measured or metered by means of suitable instruments is regulated or controlled in accordance with the indication of said instrument or the quantity or value registered by said instrument.

In making a regulation dependent on the indication of an instrument it is of primary importance to avoid a reaction of the members, elements or mechanisms operated, in order to perform the control or regulation on the measuring or indicating instrument as such a reaction, as a rule, entails inaccuracy, sometimes in a steadily increasing amount, and a time lag. It is an object of the present invention to provide a control or regulation system of the type mentioned in which neither reaction nor time lag between the impulse and the starting of the regulation process occurs.

It is a further object of the invention to provide a regulation or control system in which a definite level of the quantity delivered and measured or of the value which should prevail is maintained, every departure from this level being immediately corrected.

Further objects will be mentioned in the following specification.

According to the invention regulation or control is performed by means of a measuring instrument having a movable pointer or indicating member which is provided or associated with a light shutter acting simultaneously on both members of a pair of light channels. Through the said channels light is admitted to photosensitive cells and the arrangement is preferably, although not necessarily, such that when the shutter carrying pointer is in its position of rest the amount of light admitted to both channels is equal. In this case the photo-electric cells may cooperate with a balanced and symmetric arrangement of electronic tubes actuating circuits and relay arrangements which are in electrical equilibrium or currentless as long as the balanced condition exists. As soon, however, as the quantities of light absorbed by the photoelectric cells are unequal or differ from the adjustment originally provided for them, the electronic tube arrangement is unbalanced, the equilibrium is disturbed and a regulating current will be set up influencing the control relays which, in their turn, now influence directly or by means of regulating members operated by them the quantity or value to be controlled.

It will also be understood that, as the measuring instrument acts merely on rays, but not directly on any mechanical or electrical equipment or adjustment means no reaction whatever, due to friction, mechanical resistance, or inertia or other forces produced by the regulator mechanism is affecting the deflection or travel of the indicating member of the measuring instrument.

The invention will be more fully understood when described with reference to a specific embodiment but it is to be emphasized that the invention resides in the system and in the underlying principle and that the embodiment described and illustrated is merely one example selected to be able to explain the invention in all its details. The following specification and the drawings show a specific installation and while using sometimes specific terms have been so selected as to clearly suggest further embodiments to the expert skilled in the art. Such further embodiments and developments as far as they come within the ambit of the annexed claims are, therefore, part of the invention as they have been foreshadowed by the present disclosure and do not constitute a departure from the essence of the invention.

Referring now to the accompanying drawings it will be seen that

Figure 3 is a diagrammatical illustration of the pointer moving in front of two apertures leading to light channels and Figure 4 is a diagram of a complete specific embodiment of the invention, showing the electronic, electric and relay means influenced by the arrangement illustrated in Figures 1 and 2 and their connections.

Figure 1:
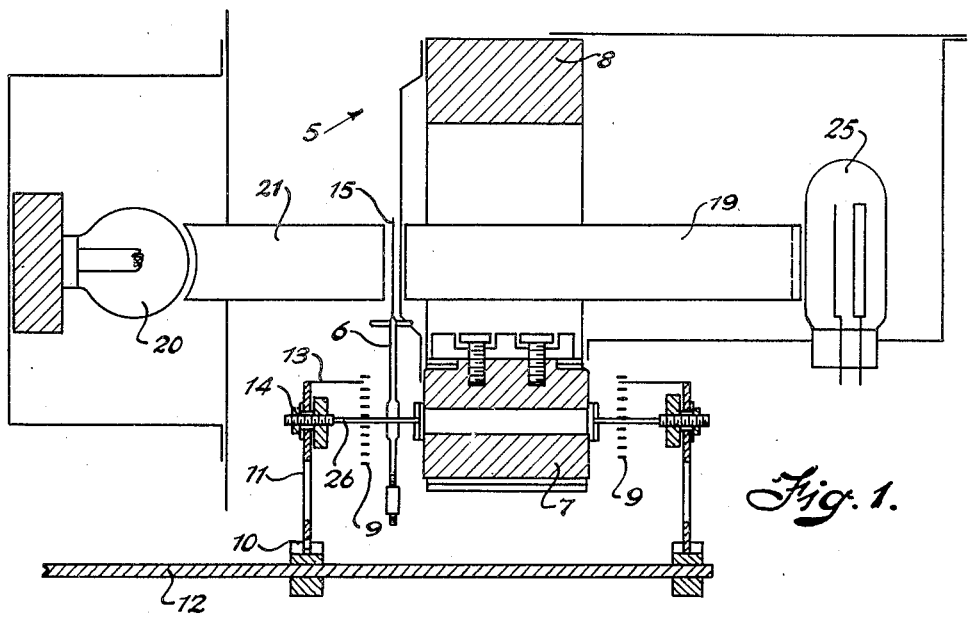
Figure 1 is a diagrammatic sectional and elevational view through the arrangement associated with the measuring instrument.
Figure 2:
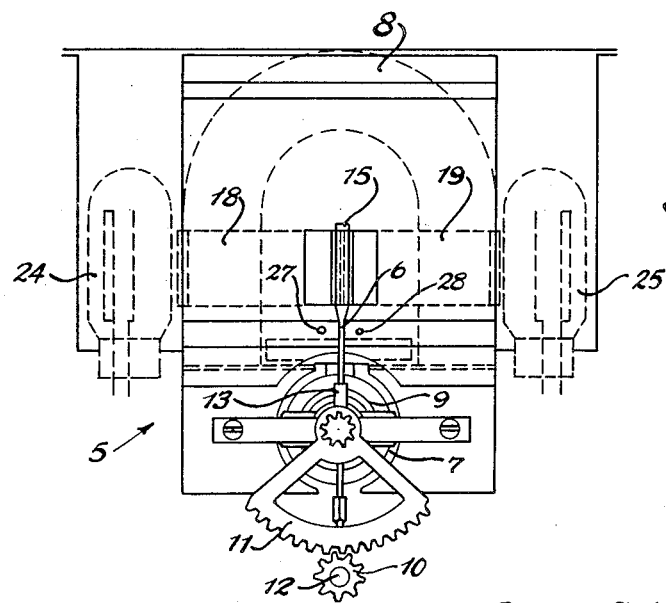
Figure 2 is a diagrammatic elevational front view of the same arrangement.

As will be clear from the foregoing general description of the invention the system comprises a measuring instrument of any kind or type for the quantity, force or value to be regulated, the regulating means for said quantity force or value to be influenced by said instrument and the intermediate means for actuating the latter by means of the former.

The measuring instrument generally referred to by the reference numeral 5 is shown as being an instrument provided with a pointer 6 which adopts a position determined by the force developed within the instrument by the quantity to be measured in one hand and by a torque produced upon deflection of the pointer and proportional to said deflection on the other hand.

The instrument shown in the drawing is a meter operating on the principle of a d'Arsonval galvanometer which comprises a rotatable member which may be a coil mounted on a magnetic core 7, arranged within a magnetic field produced by a permanent magnet 8. The rotating member drives a shaft 26 carrying the pointer.

The counter torque is produced by a coiled spring 9 acting on said shaft. The torque produced by the coiled spring 9 is adjustable and an adjustment gear consisting of a toothed segment 11, a pinion 10 and a shaft 12 is provided, the latter carrying a dial (not shown) indicating the adjustment of the spring 9. The arm 13 which determines the effective or active length of the coiled spring is secured to the segment 11 whose position is adjusted by means of a knob on shaft 12 (not shown).

As will be described later the system will have the tendency to adopt a position of balance and as this point of balance will depend on the counter torque exercised by the helical spring, the adjustment of the effective length of the latter which is indicated on the dial (not shown) associated with shaft 12 makes it possible to select any point within the range of the measuring instrument as the zero or balance point.

Two limit stops 27, 28 prevent the pointer from being moved beyond the point at which it may be used as a regulator.

In all other respects the instrument shown is a conventional instrument and it is not deemed necessary to describe its details further. Moreover, the nature or construction of the instrument has no bearing on the present invention. The instrument might as well be a flow meter or a dynamometer or any other kind of instrument.

The pointer 6 of the instrument, according to the invention, is provided with a shutter 15 which moves in front of two light channels 18, 19 formed by a suitable optical system, which may consist of a tube provided with a lens system or of a metal or glass tube provided with inner reflecting surfaces or of a rod or bar of a transparent plastic having a coefficient of refraction which will produce total reflection at its surface so that it may be used as a conductor for parallel light rays. Behind the pointer a source of light 20 is placed the light of which is conducted towards the apertures 16, 17 by a further light channel or channels 21 in exact alignment with the channels 18, 19. Behind each light channel a photoelectric cell 24, 25 is arranged at a distance larger than the distance between the apertures. To permit such an arrangement the light channels are curved or arranged along a broken line in the manner shown in the diagram Figure 4.

The extent to which the shutter 15 covers the apertures in the position of rest of the pointer or leaves them uncovered may vary in accordance with the specific purpose to be achieved and it depends on the nature of the quantity to be controlled, of the measuring instrument and the electronic arrangement which is to be activated. If the light channels 18, 19 are completely uncovered by the shutter 15 in the position of rest the moving of the pointer produces a resultant indication equal to the difference between a constant and a variable factor, the latter being proportional to the pointer deflection. A similar result is obtained when the apertures are covered completely by the shutter in the position of rest.

If the shutter covers part of the apertures in the position of rest the resultant indication of both photosensitive cells will be equal to the difference between two variable factors, one of them increasing and the other decreasing with the deflection of the pointer.

The shape of the aperture in itself is not material but a rectangular aperture with its long side arranged in the direction of the pointer will, of course, produce the greatest change in the illumination with a given deflection of the pointer and will, therefore, produce the greatest sensitivity. The latter, however, depends also on the sensitivity of the indicating or metering instrument, on the design of the light system and on the construction and arrangement of the regulating device and of the electrical part of the arrangement.

The arrangement which is inserted between the photocells and the regulating mechanism in order to operate the latter in accordance with the light absorption by the former consists of the operative circuits of the photocell 24, 25 whose cathodes may be provided with a D. C. current by means of conductor 32 leading to rectifier 33, which, in turn, is provided with A. C. current from the mains 29, 30. The anode circuits 34, 35 of the photoelectric cells are separate circuits each of them connected with the grid circuit 36, 37, respectively, of an electronic amplifier arrangement, the electrode systems 48, 49 of which may be arranged within the same bulb 38. However, said electrode systems are separate systems, each comprising a cathode 39, 40, respectively, a grid 41, 42, respectively, and a plate 43, 44, respectively.

To facilitate balancing the circuits 34, 35 may be joined in the well known manner by means of resistances 45, 46 and condensers 55, 56 connected in parallel to the latter to a common neutral conductor 47 which may be connected with a neutral point, such as the conductor 57 joining, for instance, the cathodes 39, 40 of the electronic amplifier systems 48, 49.

The plates 43, 44 of the electronic systems 48, 49 are preferably connected with the two ends of a transformer winding 50 of a transformer 52, so that the amplified currents generated in the electronic systems 48, 49 are neutralizing each other in their action on the said transformer, when both are equal. The exact center 51 of the coil 50 may be connected with one of the mains 29, preferably with the grounded or neutral conductor.

The two ends of the secondary 53 of the transformer 52 are connected with the two grids 54, 58 of two gas filled tubes, preferably so called Thyratron tubes 59, 60 arranged in opposition on both sides of a neutral conductor 61 which in its turn may be connected with the exact center 62 of the coil 53. The conductor 61 is moreover connected with the two cathodes 63, 65 of the Thyratron tubes and contains the condenser 64. The circuit 75 of one of the rectifier arrangements of rectifying tube 33 contains resistances 66 and 67, one of which is made adjustable and permits to include part of its resistance and an additional resistance 68 in a branch connection leading to the neutral conductor 61 of Thyratron arrangement. This arrangement in cooperation with the resistances 69, 70 inserted between conductor 61 and the grid circuits of the Thyratron tubes and with the resistances 71, 72 connected with the grids permits to give to the Thyratron tubes a grid bias which will cut off the passage of current through them under normal or balanced conditions.

The filaments 91 of the Thyratron tubes are provided with currents by means of a filament circuit 90 supplied with current from the mains by means of a branch circuit 88 and a transformer 89.

The plates 76, 77 of the Thyratron tubes are connected with plate circuits 78, 79 containing the control relays 80, 81. Condensers 82, 83 may bridge the relay coils.

The relays 80, 81 by means of their armatures 86, 87 control the circuits 84, 85 which supply the regulation or control means of the quantity or value. For instance, if the current supply of some installation is to be controlled, these circuits would control the solenoids operating the controller or switch for the installation. Or if the flow of a fluid is to be regulated this circuit would control the solenoids operating the gate valve.

These actual control means are not shown as their construction varies in accordance with the purpose to be achieved and as they form well known components used in the known manner.

It will, however, be understood that the relays 80, 81 may be used directly for regulating purposes in some cases.

Assuming that the quantity to be regulated is say a material quantity such as a fluid, or the amperage or the voltage of a current supplied, then it will be clear that the meter has to be an instrument of the type adapted to measure this quantity, for instance, a flow meter, an ampere meter or a galvanometer or voltmeter. As it is intended to maintain a given quantity (gallons, cubic feet, amperes, volts, etc.) the countertorque supplied by the spring 9 has to be adjusted accordingly. This is done by adjusting the active length of the coiled spring by means of a knob as above explained.

Once the spring has been adjusted and the apparatus is in operation, a deflection of the pointer will indicate that the quantity measured differs from the normal quantity as adjusted.

The pointer when deflected will move the shutter 15 and thereby obstruct the passage of light rays from the source of light 20 to the photocells in one of the channels 18, 19 in accordance with the position to which it was moved or alternatively will increase the area through which rays may pass in one channel and reduce it in the other channel. In both cases the currents engendered in the two photocells will be unequal.

As has been already explained, the two electrode systems 48 and 49 under normal conditions in which the grid bias is the same for both systems will produce currents (if any) which will counterbalance or neutralize each other, as they act in opposite directions on coil 51 of transformer 52. The transformer, secondary therefore, will not carry any current.

When the pointer is deflected, however, the photocurrents produced in the two cells 24, 25 will be unequal and the voltage drop in the resistance 45 and 46 will, therefore, also be unequal. This results in different voltages prevailing in the circuits 36, 37 leading to the grids 41, 42 of the two electrode systems 48, 49. Unequal currents now flow in the circuits of plates 43 and 44 which no longer balance each other and which produce a current in the secondary 53 of transformer 52.

As has already been explained, the grids 54 and 58 normally are biased to cut off current flow through the Thyratron tubes 59, 60. Therefore, relays 80, 81 are not energized for lack of a plate current. As soon, however, as a current flows through the secondary 53 to oppose itself to the grid bias voltage in one of the two Thyratron tubes a discharge sets in, the tube "fires" and a plate current flows energizing one of the relays 80, 81 in the plate circuit. The relay then actuates the regulator proper in one of the circuits 84, 85.

It will be observed that the direction of the current flow in the transformer 52 will determine which Thyratron "fires" and that this direction of flow in its turn depends on the currents engendered in the systems of tube 38 and, therefore, on the photocurrents produced in the photoelectric cells 24, 25.

A large amount of unbalancing will cause the Thyratron tubes to fire and to energize the control relays until near balance is restored. Then the above explained action starts and continues until balance is restored.

It will be noted that the quantity, value, force or the like which is to be regulated need not be one which expresses itself in simple units. Any specific value, expressing itself in combined, relative or reduced units may be regulated provided a measuring instrument for them is available.

Likewise, it may be mentioned that the arrangement showing Thyratron tubes with a grid bias cutting off the current flow through the tube which start a discharge as soon as the negative grid bias is reduced may be replaced by other balanced arrangements capable of starting a discharge or of increasing materially the current flow through them when unbalance occurs in their control circuits.

We claim:

1. A system for regulating, by means of regulating relays, quantities, forces and other factors capable of being measured by means of a measuring instrument influenced by the supply, delivery or application of said quantities, forces and other factors, and provided with a movable indicating member adapted to be moved in two directions from a position of rest, comprising a source of light, light channels arranged in operative relation with respect to said source of light on both sides of the position of rest of said indicating member, means for influencing the transmission of light through said channels upon each movement of the indicating member from its position of rest, photo-electric cells at the ends of said channels, symmetric operative circuits for the said cells, means for producing a resulting current dependent for its polarity on the currents engendered in the photo cells, including a circuit carrying said currents of opposite directions neutralizing each other, if equal, a further circuit containing gaseous tubes with control electrodes, each tube being adapted to be influenced by a current flowing in one direction, means for coupling said two last named circuits, and an output circuit for said gaseous tubes for operating the aforesaid regulating relays, regulating the supply, delivery or application of quantities, forces and other factors.

2. A system for regulating, by means of regulating relays, quantities, forces and other factors capable of being measured by means of a measuring instrument influenced by the supply, delivery or application of said quantities, forces and other factors, and provided with a movable indicating member adapted to be moved in two directions from a position of rest, comprising a source of light, light channels arranged in operative relation with respect to said source of light on both sides of the position of rest of said indicating member, means for influencing the transmission of light through said channels upon each movement of the indicating member from its position of rest, photo-electric cells at the ends of said channels, symmetric operative circuits for the said cells, an amplifier arrangement, including amplifier circuits arranged symmetrically with respect to each other, producing and carrying currents proportional to those engendered by the photo cells, a circuit branch carrying the resulting current from said amplifiers, including a translation member, and a further symmetric electronic tube arrangement with control electrodes adapted to normally cut off the current flow through the tubes, connected input, biasing and control circuits for said electronic tubes, with a common circuit branch coupled with said translation means, the polarity of the flow of current through said translation means acting on one of the control electrodes, so as to produce a current flow through the electronic tube controlled by the same, and an output circuit associated with each of the electronic tubes containing the regulating relays for producing the regulation of the quantity, force or factor controlled by the system.

3. A regulating and control system for regulating, by means of regulating coils, quantities, forces and other factors, capable of being measured by means of a measuring instrument, including a movable indicating member adapted to be moved from a position of rest in two opposite directions, comprising a source of light, channels arranged in front of said indicating member adjacent to each other and adapted to transmit light from said source, a photo-electric cell arranged at the end of each light channel, shutter means associated with said indicating member arranged in front of said light channels, and influencing the passage of light through said light channels equally in the position of rest of said indicating member and differently upon any deviation of said indicating member from its position of rest, an operative circuit for each cell, a symmetric amplifier arrangement with amplifiers associated with each operative cell circuit, producing currents reproducing proportionally those flowing through the operative cell circuits, operative amplifier circuits connected with each other so as to form a single circuit in which said amplified currents oppose each other, thereby either neutralizing each other or producing a resulting current of a predetermined polarity determined by the deviation of said indicating member from its position of rest, a further symmetric electronic circuit arrangement including a pair of gaseous tubes with control electrodes, an inductive coupling between said two last named circuits, the control electrodes of the gaseous tubes being controlled by the unidirectional currents transmitted to said electronic circuit, balanced operative symmetric output circuits for said gaseous tubes, means for providing the control electrodes of each tube with a biasing voltage and output circuits for said gaseous tubes containing the regulating coils for producing the operating regulation of the quantity, force or factor to be regulated.

4. A control system according to claim 3 comprising a grid biasing circuit for the gaseous tubes including resistances and connected with a plate circuit of one of the gaseous tubes.

5. A system for regulating, by means of electromagnetic regulating devices, variable quantities, forces and other factors, capable of being measured by means of a measuring instrument influenced by the said variable quantities, forces or other factors, and provided with a movable indicating member adapted to move in two directions from a central position of rest, adjusted to indicate the predetermined variable quantity, force or other factor to be maintained, comprising photo-electric means adapted to be controlled by said movable indicator member, means for producing a resulting current flow controlled by said photo-electric means, the direction of which corresponds to the side on which the deviation of the indicating member from its position of rest occurs, a pair of gaseous tubes with control electrodes, adapted normally to cut off the current flow through said tubes, input, biasing and control circuits for the said tubes, connected to form a single electronic control circuit, a coupling between said single circuit and the aforesaid means to produce a current flow in a direction dependent on the deviation of the indicating member, the biasing arrangement for the electrodes of the gaseous tubes being symmetrically arranged with respect to the aforesaid single electronic circuit and including a source of voltage and a symmetric connection for providing the input and biasing circuits with the same biasing voltage, output circuits for each gaseous tube, each output circuit containing one of the electro-magnetic regulating devices of the system, the current flow produced by the photo-electric means in the electronic circuit counteracting one of the biasing voltages, and producing a change of the current flow in one of the output circuits of the gaseous tubes, acting on one of the electro-magnetic regulating devices.

6. In a control system as claimed in claim 5, a translation member consisting in a transformer having a primary winding carrying the output currents of the amplifiers and a secondary transformer winding connected with controlling electrodes of the gaseous tubes, and means for providing the center of said secondary winding with a biasing voltage preventing current flow through said gaseous tubes.

7. A regulating and control system for regulating by means of electromagnetic regulating devices, quantities, forces and other factors, capable of being measured by means of a measuring instrument with a movable indicating member influenced by the supply, application or delivery of said quantities, forces or other factors, said indicating member being adapted for movement in two directions from a position of rest, indicating a predetermined value of the variable quantity, force or other factor, comprising photoelectric means controlled by the said indicating member, a circuit influenced by the said photo-electric means carrying a resulting current produced by the opposition of the currents produced in said photo-electric means, a pair of gaseous tubes with control electrodes, adapted to cut off normally the current through said tubes, input and control circuits for the said gaseous tubes, connected to form a single electronic control circuit, a coupling between the said single circuit and the circuit influenced by said photo-electric means, said coupling being arranged for different action of the control electrodes of the gaseous tubes, a biasing arrangement for the control electrodes of the gaseous tubes, including a source of current in a symmetric connection for providing each input circuit with a biasing voltage, output circuits for each of the said gaseous tubes, each output circuit containing one of the electromagnetic regulating devices, a current introduced into the single circuit formed by the input and control circuits and coupled with the circuit influenced by the photo-electric cells counteracting one of said biasing voltages applied to the control electrodes of the gaseous tubes and producing a change of the current flow through one of the said gaseous tubes acting on the electromagnetic regulating device.

DORRIS C. McCRARY.
JAMES D. DENT.

REFERENCES CITED

The following references are of record in the file of this patent:

UNITED STATES PATENTS

| Number | Name | Date |
|---|---|---|
| 1,807,602 | Radford et al. | June 2, 1931 |
| 2,100,934 | Berges | Nov. 30, 1937 |
| 2,140,355 | Gulliksen | Dec. 13, 1938 |
| 2,142,254 | Nunam | Jan. 3, 1939 |
| 2,192,568 | Weathers | Mar. 5, 1940 |
| 2,227,147 | Lindsay | Dec. 31, 1940 |
| 2,236,255 | Young | Mar. 25, 1941 |
| 2,237,665 | Gulliksen | Apr. 8, 1941 |
| 2,256,595 | Metcalf | Sept. 23, 1941 |
| 2,365,601 | Sipman | Dec. 19, 1944 |
| 2,375,159 | Wills | May 1, 1945 |